United States Patent Office.

JOHN GREIVES, OF PATERSON, NEW JERSEY.

ELECTRICAL INSULATING MATERIAL.

SPECIFICATION forming part of Letters Patent No. 291,717, dated January 8, 1884.

Application filed August 2, 1883. (No specimens.)

*To all whom it may concern:*

Be it known that I, JOHN GREIVES, a citizen of the United States, residing in the city of Paterson, county of Passaic, and State of New Jersey, have invented certain new and useful Improvements in Electrical Insulating Material, fully described in the following specification.

This invention relates to a composition of matter for the insulation of electrical conductors and of cells for batteries wherein acid liquids are used, the same consisting in common rosin fused with either simple or compound silicates of magnesia as found in natural minerals—as talc, French chalk, soapstone, asbestus, and white and green serpentine. In preparing and combining these materials in my new composition, the mineral is powdered and stirred into the rosin while the latter is in a fused condition, and the powder may be thus combined while cold; but in practice the ingredients assimilate and combine into a homogeneous mass more readily when the powdered mineral is heated to about the melting-point of the rosin before commingling. All the above-named minerals possess substantially the same chemical constitution, consisting, chiefly, of silicic acid and magnesia. The rosin, while heated, will absorb fifty per cent. of the silicate and retain the semi-fluid consistency (while hot) necessary to pour it into receptacles requiring a coat upon their interior—as battery cells and tanks. With an admixture of fifty-two to sixty or even greater percentages of the silicate the compound is no longer semi-fluid or plastic, and to reduce it to this condition for certain purposes I add from five to ten per cent. of a fatty fixed oil or fat or hydrocarbon oil. The composition then possesses a certain degree of plasticity when cold, and is not changed in this respect with age or exposure.

When it is desired that the composition shall be plastic at first and harden with exposure to the air, I add a similar proportion of an oxydrying oil, thus securing a great degree of fluidity at first, by which the compound can be readily applied to the interior of pipes and vessels, and a degree of subsequent hardness more suited to retain its form and endure wear. The fat or oily ingredient combines readily with the other elements of the composition when heated, and the compound is thus peculiarly adapted, in a semi-fluid state, for application to the interior of electrical conduits or battery-cells, and serves, in the latter case, not only to prevent leakage of the solutions employed, but to prevent leakage of the electrical charge or current. The rosin, when combined with the silicate, either with or without the addition of oil, entirely loses its brittle and fragile character, and combines perfectly with the loose powdered mineral into a homogeneous substance impervious to water, and not affected by sulphuric, chlorohydric, or other acids when talc is used, and is but slightly affected by acids when the silicate is employed in the form of soapstone. Its adhesive quality is also very great, so that it will stick to wood and metals firmly, and retain its place as a coating upon wires and submarine cables. This is especially the case when asbestus is used, the mineral being very light, and a large bulk of it being absorbed when mingled in equal weights with the fused rosin. Although the asbestus is reduced to fine powder before mixing, the composition made with asbestus appears to have a fibrous character, and is tougher and more elastic and adhesive than when prepared with the other forms of the silicate.

Having thus set forth the nature of the composition and the methods of preparing it for different purposes, it is evident that the proper proportions of the ingredients and the nature of the oil that may be used, whether oxydrying or not, can readily be determined with reference to the purpose for which the compound is prepared. Thus the material, when cold, has little or no plasticity if prepared with more than forty per cent. of the silicate of magnesia, and may be made exceedingly hard by increasing the percentage of that ingredient, while the addition of ten per cent. of oily matter renders the mixture plastic when cold, and capable of adhering to and bending with a metallic wire to any desired extent.

The materials used are taken in their ordinary commercial state, and require no special purification for this purpose.

I do not claim in this application anything set forth and claimed in my Patent No. 278,536, issued May 29, 1883, for a material composed of chalk and rosin, nor in my application No. 93,469, filed May 1, 1883, for a patent on material composed of lime and rosin, these several cases all being in reality subdivisions of the application upon which the said Patent No. 278,536 was based, and in which I at one time claimed, broadly, the combination of rosin or colophony with inert alkaline mineral earths. I have, however, in this application restricted myself to the particular combination set forth, and do not claim anything else herein.

Having thus described my invention, I claim the same as follows:

1. The composition herein described for an electrical insulating material, consisting in rosin and natural silicate of magnesia—as talc or soapstone—united or combined by fusion, substantially as and for the purpose set forth.

2. The electrical insulating material consisting in rosin and natural silicate of magnesia tempered by an admixture of fat or oil, substantially as and for the purposes set forth.

In testimony whereof I have hereunto set my hand in the presence of two subscribing witnesses.

JOHN GREIVES.

Witnesses:
FRANK GEWHILL,
ROBERT I. HOPPER.